2,711,952

PRODUCTION OF IRON BRIQUETTES BY REDUCTION OF IRON OXIDE

Howard F. West, Joliet, and John H. Veale, Coal City, Ill., assignors to Illinois Clay Products Company, Joliet, Ill., a corporation of Illinois No Drawing. Application July 30, 1951, Serial No. 239,381

6 Claims. (Cl. 75—33)

This invention relates to scrap iron substitutes and the like, and their preparation.

According to the invention, iron ore in the form of powder, screenings, blast furnace flue dust, concentrates from taconite, etc., is utilized by molding or otherwise forming the same into brick and the like. The shaped bricks have various uses. Among other uses, the iron ore therein may be reduced without the use of the blast furnace to provide an efficient and inexpensive substitute for scrap iron. Another use therefore, is for blast furnaces to increase their capacity and efficiency.

Further objects and the nature of the invention may be readily understood by reference to an illustrative product and its method of manufacture.

Utilization of iron ore in fine or powdered form has long been a problem, and is now one which is becoming of great importance. Another presently acute problem is scrap shortage. In addition to the ordinary sources of iron ore too fine for practical utilization, are screenings from ore delivered to the blast furnace. The blast furnace has long been the bottleneck of the steel industry, and production can be increased by screenings from the ore substantially all fines smaller than ¼ inch. This greatly increases the supply of ore fines though it does reduce the amount of blast furnace dust. Many methods have been suggested for utilization of such fines, such as for example as the formation of so called sponge iron. Sponge iron has not been a satisfactory solution for this problem because it tends to float on the ore bath in the open hearth and insulate the metal from the heat. Moreover the chunks off sponge iron themselves are very difficult to heat because of their insulating characteristics.

We have discovered that such fine ore may be inexpensively agglomerated into relatively dense brick and the like in sizes for practical utilization, by bonding the same with iron sulphate. For convenience the term "brick" will be used in a generic sense to designate the formed article regardless of its size or shape or method of formation. The iron sulphate may be formed by the addition to the ore of a small amount off sulphuric acid or by the addition of spent pickle liquor which is mainly iron sulphate solution, i. e., $FeSO_4$. For example, to 100 parts by weight of iron ore, about 3 parts of concentrated sulphuric acid (66 degrees Bé) is added. If pickle liquor be used it should be added in an amount to provide iron sulphate ($FeSO_4 \cdot 7H_2O$) by weight equivalent to that resulting from the addition of 3 parts by weight of concentrated sulphuric acid. In addition about 15 parts by weight of fine coke (e. g., coke breeze, preferably containing no particles larger than minus ¼ mesh) is mixed with the powdered iron ore. In cases where an increase in the amount of slag is not objectionable, about 3 parts by weight of plastic fire clay or 1½ parts of bentonite may be added to plasticize the mixture and thereby improve working qualities for forming brick, particularly by the dry press method. The acid will preferentially react with the iron ore, but if clay be present there will be some reaction of the acid with the clay to form a bond. Usually however it is desirable to minimize the amount of silica and alumina in the ore, because it increases the depth of the layer of slag on the bath of molten metal, thereby tending to insulate the metal from the heat above in the open hearth and because of the increase in limestone necessary to react with the silica and alumina. Open hearth slag does not have the by-product value of blast furnace slag and for that reason also should ordinarily be minimized.

The bricks, etc., may be formed in various ways, e. g., by dry pressing, extrusion and briquetting either by pressure or vibration. The formed bricks are then heated. When heated to about 300°–400° F. the iron sulphate bond is fully developed.

Heating takes place in a reducing atmosphere not substantially higher than 1900–2000° F. to bring about a reduction of the iron oxide to iron. The temperatures are preferably raised gradually to bring about elimination of sulphur in the form of $SO_3$ or $SO_2$ before the carbon exerts its reducing action. If blast furnace dust be used, such dust already carries carbon in the form of coke breeze in a proportion higher than necessary for reduction, and preferably some iron ore should be added to the blast furnace dust to reduce the proportion of carbon. If taconite concentrate be used, the fine condition of the iron oxide concentrate ($Fe_3O_4$) makes formation by the dry press method relatively more difficult. Addition of other ore in coarser condition to the taconite concentrate makes briquetting by the dry press method practicable. If a greater amount of liquid be added, taconite concentrate may be formed by extrusion or briquetting.

The amount of carbon in the form of coke breeze and the like mixed without iron ore should be adjusted to prevent melting of the entire brick when the iron-carbon eutectic is reached. Preferably the mixture should contain less carbon than a eutectic mixture. The temperature should likewise be controlled to avoid complete fusion of the brick. Nevertheless temperatures should be high enough to cause a partial fusion so as to fill the voids (such as those present in sponge iron) resulting from the reducing action of the carbon. The amount of carbon used depends upon (1) the amount of iron in the ore; (2) the amount of CO (carbon monoxide) which is not converted to $CO_2$; and (3) the nature of the iron oxide, i. e., the relative amounts of $Fe_2O_3$ and $Fe_3O_4$ in the ore.

During the reducing operation a bond in the nature of a ceramic bond such as iron silicate is formed to give the brick adequate strength despite destruction of the iron sulphate. Of course the metallic iron itself forms an adequate bond.

Thus the brick or other shapes are self sustaining throughout the reducing operation; and being heated in a reducing atmosphere, access of heat to the brick is much more efficient than the sponge iron process wherein the carbon or coke tended to insulate the ore against the access of heat. In the present method the exterior of the brick is first reduced to metallic iron and in such form the brick becomes progressively highly conductive toward its center, the iron in its molten or incipient fused condition substantially filling or closing the voids and eliminating the porous thermal insulating structure which characterizes sponge iron.

Any form of reducing furnace may be employed. A tunnel kiln designed to exclude air and to maintain a reducing atmosphere provides an economical means of high capacity for effecting reduction. The straight type of tunnel kiln seems preferable to the circular type since it may be kept closed to reduce air except for the short interval when cars enter and leave the kiln. Being self sustaining throughout the heating operation, the brick may be stacked in the reducing furnace exactly as fire brick are stacked, being spaced to facilitate penetration of heat to the interior of the stack. The exposed surfaces and progressively conducting nature facilitate application of heat to and penetration to, its interior.

The kiln may be either of the muffle type in which it is easier to maintain a reducing atmosphere though more difficult to transmit the heat to the product, or it may be an open burner kiln wherein the burners are adjusted to maintain a reducing atmosphere.

In a tunnel kiln cooling must of course be effected with gases of combustion of a reducing character preferably by re-circulation, and not with air as in a conventional tunnel kiln.

It is possible by the foregoing method to provide a substitute for scrap iron containing 75% to 85% of metallic iron and as little as .5% of sulphur. Except for the slag problem and the amount of limestone necessary in the open hearth, sulphur is not objectionable because even with the addition of sulphuric acid or pickle liquor to form a bond, the sulphur is easily eliminated down to the minimum amount which is customary in conventional operation of an open hearth.

Uses of the illustrative brick are not limited to the open hearth furnace but they may be used wherever scrap is used and as a substitute for scrap. Moreover, they have great utility in the blast furnace by increasing its capacity as much as 20%, being in effect very highly concentrated and partly reduced ore with a substantial amount of impurities eliminated. This permits reduction in the proportion of limestone and coke.

Obviously the invention is not limited to the details of the illustrative product and its method of preparation since these may be variously modified. Moreover it is not indispensible that all features of the invention be used conjointly, since various features may be used to advantage in different combinations and subcombinations.

Having described our invention we claim:

1. The method of reducing iron ore which comprises molding a mixture of iron ore in finely subdivided condition, 15% coke in finely subdivided condition and a small amount of sulphuric acid into the form of a brick or the like, developing an iron sulphate bond by reaction of the acid with the ore, placing the brick in spaced relation in a heating chamber with exteriors directly exposed to a reducing atmosphere in the chamber, and heating the brick in said chamber in a reducing atmosphere to about 2000 degrees F. to reduce iron ore to about 75% metallic iron and partly to fuse the brick, said heating being continued so as progressively partly to fuse the brick from its exterior to its interior to reduce the voids therein, thereby to increase its thermal conductivity.

2. The method of reducing iron ore which comprises molding in the form of a brick a mixture of iron ore and coke in finely divided condition and a small amount of sulphuric acid, heating the brick to about 300 degrees F. to promote reaction between the acid and iron ore to develop an iron sulphate bond, and then heating the brick in a reducing atmosphere to about 2000 degrees F. to partially reduce the ore to about 75% to 85% metallic iron and partly to fuse the brick to reduce its porous condition, the ratio of coke to iron ore being insufficient to result in a eutectic mixture thereby to avoid complete fusion of the material during the reducing process.

3. The method of producing metallic iron from iron oxide which comprises molding in the form of a brick a mixture of iron oxide and coke both in finely granular form together with about 3% of concentrated sulphuric acid, heating the brick to temperatures of the order of 300 degrees F. to facilitate reaction of the acid with the iron oxide to form an iron sulphate bond, and then heating the brick in spaced relationship with their outer surfaces exposed to a reducing atmosphere to temperatures in the region of 2000 degrees F. to partly reduce the iron oxide and partly to fuse the brick to minimize the porosity resulting from said reduction, the ratio of coke to iron oxide being insufficient to result in a eutectic mixture fusible at the aforesaid reducing temperature, thereby to avoid complete fusion of the brick at such temperatures.

4. The method of producing metallic iron from iron oxide which comprises molding in the form of a brick a mixture of iron oxide and coke both in finely granular form together with about 3% of concentrated sulphuric acid, heating the brick to temperatures of the order of 300 degrees F. to facilitate reaction of the acid with the iron oxide to form an iron sulphate bond, to bond the brick, and then heating the brick in spaced relationship with their outer surfaces exposed to a reducing atmosphere to temperatures in the region of 2000 degrees F. to reduce the iron oxide and partly to fuse the brick to minimize the porosity resulting from said reduction to form a brick having high thermal conductivity and dense enough to sink in molten metal, and limiting the proportion of coke in the brick to avoid a eutectic mixture of iron oxide and coke which would cause a complete fusion of the brick.

5. The method of making a scrap iron substitute for open hearth furnaces and the like which comprises the steps of mixing finely divided material containing a high percentage of iron oxide and silicate impurities and sufficiently finely divided coke to unite chemically with the oxygen in the iron oxide, of temporarily bonding the mix with iron sulphate bonds, of forming the mixture under pressure into bricks, of placing the bricks in spaced relationship, and of heating the bricks in a reducing atmosphere at a temperature sufficient to convert most of the iron oxide to metallic iron and to partially fuse the silicates.

6. The method of making a scrap iron substitute for open hearth furnaces and the like which comprises the steps of mixing iron ore fines, about 15% finely divided coke, and a small proportion of concentrated sulphuric acid, of forming the mixture under pressure into bricks, of placing the bricks in spaced relationship, and of heating the bricks in a reducing atmosphere at a temperature sufficient to convert most of the iron oxide to metallic iron and to partially fuse the silicates.

References Cited in the file of this patent
UNITED STATES PATENTS

| Number | Name | Date |
|---|---|---|
| 800,698 | Wedge | Oct. 3, 1905 |
| 2,065,618 | Sherwood | Dec. 29, 1936 |
| 2,072,072 | Hartgen | Feb. 23, 1937 |
| 2,287,663 | Brassert | June 23, 1942 |